(12) United States Patent
Tsukagoshi et al.

(10) Patent No.: US 7,518,972 B2
(45) Date of Patent: Apr. 14, 2009

(54) HOLOGRAPHIC MULTIPLEX RECORDING METHOD

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 566 days.

(21) Appl. No.: 10/579,823

(22) PCT Filed: Nov. 4, 2004

(86) PCT No.: PCT/JP2004/016329

§ 371 (c)(1),
(2), (4) Date: May 17, 2006

(87) PCT Pub. No.: WO2005/050331

PCT Pub. Date: Jun. 2, 2005

(65) Prior Publication Data

US 2007/0104068 A1    May 10, 2007

(30) Foreign Application Priority Data

Nov. 21, 2003  (JP) .............................. 2003-392774

(51) Int. Cl.
*G11B 7/00* (2006.01)
(52) U.S. Cl. .................................. 369/103; 369/124.09
(58) Field of Classification Search ........................ None
See application file for complete search history.

(56) References Cited

U.S. PATENT DOCUMENTS 5,671,073 A    9/1997  Psaltis et al.
6,614,566 B1   9/2003  Curtis et al.

FOREIGN PATENT DOCUMENTS

JP    A 2002-040908    2/2002

OTHER PUBLICATIONS

George Barbastathis et al., "Shift multiplexing with spherical reference waves." Applied Optics, 1996, vol. 35, No. 14, pp. 2403-2417.

*Primary Examiner*—Paul Huber
(74) *Attorney, Agent, or Firm*—Oliff & Berridge, PLC

(57) ABSTRACT

A holographic multiplex recording method is provided in which remaining dynamic range in each recording area is made more uniform upon holographic multiplex recording. In this holographic recording method, a first-stage recording spot row $RX_1$ is formed by arranging recording spots RS in an X-axis direction without overlapping, and then a second-stage recording spot row $RX_2$ formed of the recording spots RS without overlapping in the X-axis direction is recorded in a position for shift multiplex recording in a Y-axis direction. This is repeated to form a Y-axis direction first multiplex recording spot matrix $TYX_1$. In this case, recording is performed to all recordable regions without shift multiplex recording in the X-axis direction. Subsequently, a Y-axis direction second multiplex recording spot matrix $TYX_2$ is formed in a position shift-multiplexed in the X-axis direction with respect to the first-stage recording spot row $RX_1$ initially recorded. The shift multiplex recording in the X-axis direction is performed in a similar manner up to a Y-axis direction last multiplex recording spot matrix $TYX_n$ to thereby complete the recording.

3 Claims, 9 Drawing Sheets

HOLOGRAPHIC MULTIPLEX RECORDING METHOD

This application is a 371 of PCT/JP04/16329, filed Nov. 4, 2004.

TECHNICAL FIELD

The present invention relates to a holographic multiplex recording method.

BACKGROUND ART

A holographic multiplex recording method has been proposed in which, when recording spots of interference fringes are formed in a recording layer of a holographic recording medium by projecting an object beam and a reference beam, a beam spot which is an overlapping projection region of the object beam and the reference beam is slightly shifted along the surface of the abovementioned recording layer for each projection to thereby form the recording spots superimposed with a slight shift in the X-axis direction and the Y-axis direction (see a reference, 10 May 1996/Vol. 35, No. 14/APPLIED OPTICS P2403-2417).

At this time, as shown in FIG. 9, the recording spots 1A, 1B, 1C, 1D, 1E, and 1F are formed so as to be shifted from one another in the X-axis direction in FIG. 9 by a shift amount $\Delta$.

For example, remaining dynamic range (DR) in the recording layer in the state where the holographic recording proceeds to the recording spot 1F in FIG. 9 is nonuniform as shown in the lower half of FIG. 9. Thus, nonuniformity is caused in the intensity of formed gratings (interference fringes), resulting in distortion of a reproduction image and an increase in bit error rate.

This will be described in more detail using FIGS. 10 to 13.

FIG. 10 shows a geometrical arrangement of superimposed holograms in typical spherical shift multiplex recording. For convenience of description, the following coordinate system is defined. That is, the X-axis is defined as the line of intersection of an incident plane of a recording optical system (a plane containing the optical axes of both the reference beam and the object beam) and the surface of the recording layer, and the Y-axis is defined as the direction orthogonal to the X-axis on the plane of the abovementioned recording layer.

Due to the geometrical shape of the recorded gratings, Bragg selectivity (Bragg mismatch with respect to the amount of shift, or a moving amount at which diffraction efficiency is nearly zero when shift motion is performed by this distance from a position providing maximum diffraction efficiency) of the holograms is the highest in the X-axis direction, and is several $\mu$m in the X-axis direction and is 100 to several hundreds $\mu$m in the Y-axis direction (see the abovementioned reference).

When actual shift amounts ($\Delta X$ and $\Delta Y$ in the figure) are larger than minimum shift amounts, shift multiplex recording can be achieved. However, if the actual shift amounts are too large, recording density is lowered. An example is shown in which shift multiplex recording with a shift of $\Delta X$ in the X-axis direction is performed followed by the shift multiplex recording in the Y-axis direction after completion of the multiplexing in the X-axis direction. Of course, the order of the multiplexing in the X-axis direction and the Y-axis direction may be reversed.

In either case, if a recording area is assumed to be a circle with a radius R, $N_p = \pi R^2 / \Delta X \Delta Y$ holograms on average are superimposed on each point in the recording layer. If the effective refractive index modulation degree of a recording material is assumed to be n1, and when recording is performed under the conditions in which the refractive index modulation degree per hologram satisfies $\Delta n = n1/N_p$, specific scheduling is not required.

Since the scheduling for recording (which is employed for angle multiplexing or the like) is not required to be considered as described above, the spherical shift multiplex recording is a holographic recording method advantageous in high speed recording. Here, the scheduling is a technique of controlling the amount of exposure for recording according to recording history of a recording material and remaining dynamic range. In angle multiplex recording or phase code multiplex recording, since a large number of holograms are multiplexed in the same region in a recording material, the exposure amount for recording must be increased stepwise as the multiplexing process proceeds. Although the recording scheduling is not required, a contrast distribution is generated in gratings to be recorded since remaining dynamic range and photosensitivity are nonuniform in a recording area to be newly recorded, causing a problem that distortion of a reproduction image and intensity nonuniformity are generated.

FIGS. 12 and 13 show the remaining dynamic range for the case where the radius R of the recording area is normalized to 1 and the shift amounts in the X and Y axis directions are $\Delta X = 0.01$ and $\Delta Y = 0.1$, respectively. Since FIGS. 12 and 13 show computational values, the entire area for $|X|, |Y| \leq 1$ is shown, but only the region inside the recording area ($X^2 + Y^2 \leq R^2$) is practically meaningful.

The relationship between the remaining dynamic range and the recording sensitivity depends on materials and the parameters of recording beam and cannot be defined in a uniform manner. However, generally, there is a tendency that the lower the remaining dynamic range, the lower the recording sensitivity. Therefore, if the dynamic range is nonuniform as shown in the graphs, nonuniformity is caused in the intensity of the formed gratings, resulting in distortion of a reproduction image and an increase in bit error rate.

DISCLOSURE OF THE INVENTION

It is an object of this invention to eliminate distortion of a reproduction image by suppressing the nonuniformity of the grating intensity caused by nonuniformity of the dynamic range in a recording layer upon multiplex recording.

The present inventor has made intensive studies and has consequently found that the above problems can be solved by performing scheduling for recording upon holographic multiplex recording such that the dynamic range in a recording layer is made uniform.

In summary, the above-described objectives are achieved by the following embodiment of the present invention.

(1) A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam, the holographic multiplex recording method comprising: an X-axis direction first multiplex recording step of forming a first-stage multiplex recording spot matrix, comprising, a step of forming a first recording spot matrix by forming and arranging recording spot rows comprising recording spots arranged with a constant pitch in the X-axis direction without overlapping, with a constant pitch in the Y-axis direction without overlapping, a step of forming a second recording spot matrix by forming and arranging recording spot rows comprising recording spots slightly phase-shifted in the X-axis direction with respect to the first recording spot matrix and having the same phase and the same pitch in the Y-axis direction as those of the first recording spot matrix, with a constant pitch in the Y-axis direction without overlapping, and a step of forming a third recording spot matrix to a last recording spot matrix by repeating formation of recording spot rows comprising recording spots slightly phase-shifted in the X-axis direction with respect to the recording spot rows of the previous recording spot matrix and having the same phase and the same pitch in the Y-axis direction as those of the recording spot rows of the previous recording spot matrix, with a constant pitch in the Y-axis direction without overlapping until immediately before the total sum of the phase shift in the X-axis direction from the first recording spot matrix to a last recording spot matrix becomes the same as the pitch between the recording spot rows in the X-axis direction; and a step of forming a second-stage to a last-stage multiplex recording spot matrices by an X-axis direction second multiplex recording step to an X-axis direction last multiplex recording step which are similar to the X-axis direction first multiplex recording step and repeat thereof, wherein: the total sum of the phase shift from the first recording spot matrix to the last recording spot matrix in the X-axis direction is set until immediately before the total sum becomes the same as the pitch between the recording spot rows in the X-axis direction; and the X-axis direction second multiplex recording step to the X-axis direction last multiplex recording step are performed by slightly shifting the phase relative to one another in the Y-axis direction with respect to each of the recording spot rows in the X-axis direction first multiplex recording step until immediately before the total sum of the phase shift in the Y-axis direction up to the X-axis direction last multiplex recording step becomes the same as the pitch between the recording spot rows in the Y-axis direction.

(2) A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam, the holographic multiplex recording method comprising: a Y-axis direction first multiplex recording step of forming a Y-axis direction first recording spot matrix by arranging first-stage recording spot rows comprising recording spots arranged with a constant pitch in the X-axis direction without overlapping, in the Y-axis direction with a slight phase shift relative to one another; a Y-axis direction second multiplex recording step of forming a Y-axis direction second multiplex recording spot matrix by arranging second-stage recording spot rows comprising recording spots arranged with a constant pitch in the X-axis direction without overlapping with reference to a position slightly phase-shifted in the X-axis direction with respect to the first-stage recording spot rows, in the Y-axis direction with a slight phase shift relative to one another; and a step of forming a Y-axis direction third multiplex recording spot matrix to a Y-axis direction last multiplex recording spot matrix by repeating a step which is similar to the above until immediately before the total sum of the phase shift in the X-axis direction from the Y-axis direction first multiplex recording spot matrix to a Y-axis direction last multiplex recording spot matrix becomes the same as the pitch between the recording spot rows in the X-axis direction.

(3) A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam, the holographic multiplex recording method comprising: a first-stage X-axis direction multiplex recording step of forming an X-axis direction first-stage multiplex recording spot matrix, the step comprising, an X-axis direction first multiplex recording step of forming an X-axis direction first multiplex recording spot row by arranging recording spots in the X-axis direction with a slight phase shift relative to one another, an X-axis direction second multiplex recording step of forming an X-axis direction second multiplex recording spot row by arranging recording spots with a slight phase shift relative to one another in positions parallel and adjacent to the X-axis direction first multiplex recording spot row and without overlapping in the Y-axis direction, and a step of forming and sequentially arranging an X-axis direction third multiplex recording spot row to an X-axis direction last multiplex recording spot row in a similar manner; and a step of forming an X-axis direction second-stage multiplex recording spot matrix to an X-axis direction last-stage multiplex recording spot matrix by a second-stage X-axis direction multiplex recording step to a last-stage X-axis direction multiplex recording step which are similar to the first-stage X-axis direction multiplex recording step and repeat thereof, wherein, in the second-stage X-axis direction multiplex recording step to the last-stage X-axis direction multiplex recording step, the recording spots are repeatedly formed by slightly shifting the phase relative to one another in the Y-axis direction with respect to each of the X-axis direction multiplex recording spot rows in the first-stage X-axis direction multiplex recording step until immediately before the total sum of the phase shift in the Y-axis direction up to the last-stage X-axis direction multiplex recording step becomes the same as the pitch between the X-axis direction multiplex recording spot rows in the Y-axis direction.

BEST MODE FOR CARRYING OUT THE INVENTION

The above object is achieved by performing holographic multiplex recording by means of: a Y-axis direction first multiplex recording step of forming a Y-axis direction first multiplex recording spot matrix by arranging first-stage recording spot rows comprising recording spots arranged with a constant pitch in an X-axis direction without overlapping, in a Y-axis direction with a slight phase shift relative to one another; a Y-axis direction second multiplex recording step of forming a Y-axis direction second multiplex recording spot matrix by arranging second-stage recording spot rows comprising recording spots arranged with a constant pitch in the X-axis direction without overlapping with reference to a position slightly phase-shifted in the X-axis direction with respect to the abovementioned first-stage recording spot rows, in the Y-axis direction with a slight phase shift relative to one another; and a step of forming a Y-axis direction third multiplex recording spot matrix to a Y-axis direction last multiplex recording spot matrix by repeating a step which is similar to the Y-axis direction second multiplex recording step until immediately before the total sum of the phase shift in the X-axis direction from the Y-axis direction first multiplex recording spot matrix to the Y-axis direction last multiplex recording spot matrix becomes the same as the pitch between the abovementioned recording spot rows in the X-axis direction.

First Embodiment

Figure 1:
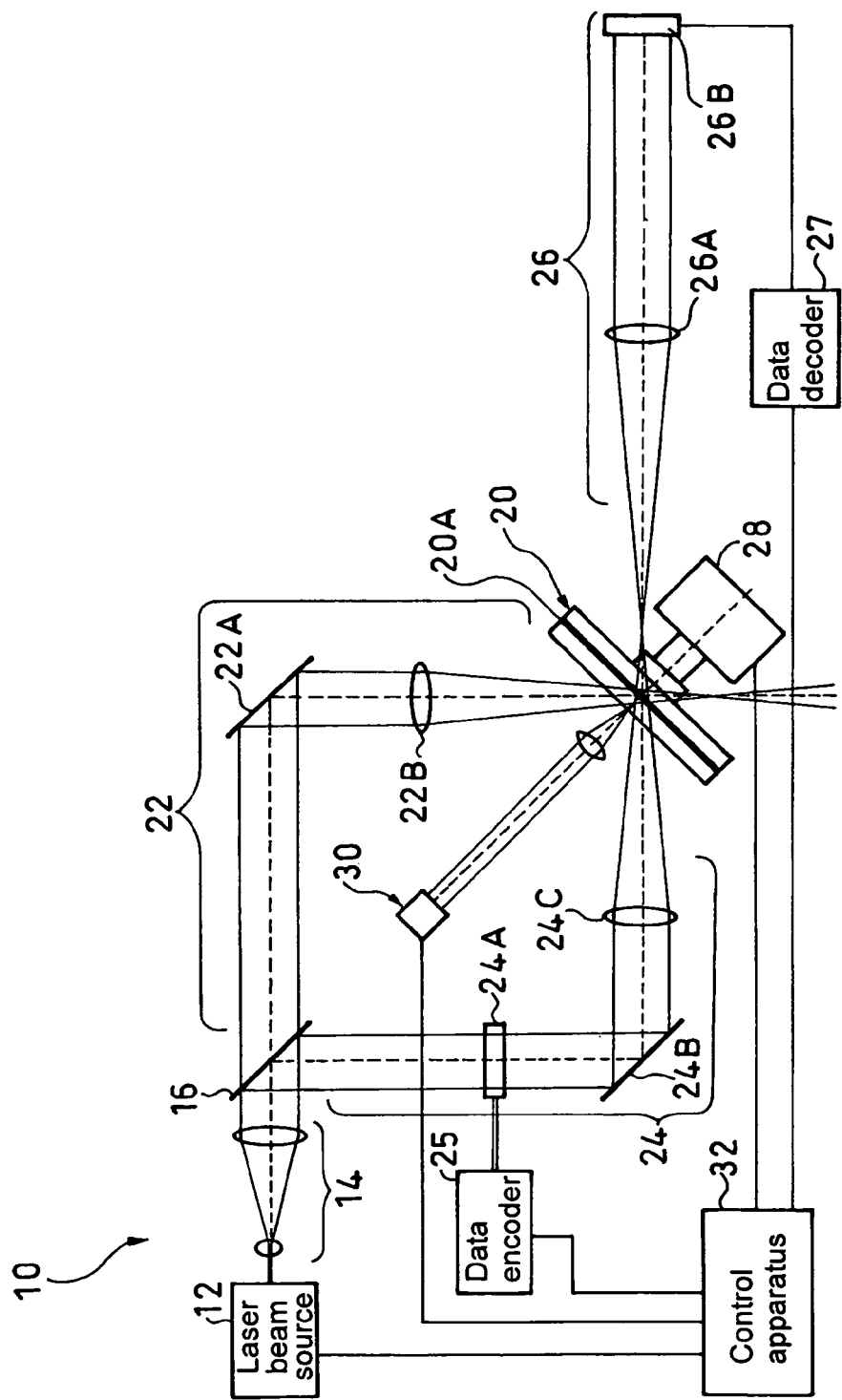
FIG. 1 is an optical system diagram showing a holographic multiplex recording apparatus for embodying a holographic multiplex recording method of the present invention.

FIG. 1 shows an apparatus for embodying the holographic multiplex recording method of the present invention.

A holographic multiplex recording apparatus 10 is configured to include: a laser beam source 12; a beam expander 14 for expanding the beam diameter of the laser beam emitted from this laser beam source 12; a beam splitter 16 for splitting the laser beam having the beam diameter expanded by this beam expander 14 into a reference beam and an object beam; a reference optical system 22 for guiding the reference beam, which is the transmission beam of the abovementioned beam splitter 16, to a holographic recording medium 20; an object optical system 24 for guiding the object beam, which is the reflection beam of the abovementioned beam splitter 16, to the abovementioned holographic recording medium 20; an imaging optical system 26 which is arranged on a line extending the optical axis of the object beam having been projected onto the abovementioned holographic recording medium 20 via the abovementioned object optical system 24 and having passed through the holographic recording medium 20; a position controller 28 for controlling a position with respect to the abovementioned reference beam and the abovementioned object beam; and a servo system 30 for detecting the position of the abovementioned holographic recording medium 20.

The abovementioned reference optical system 22 is configured to include a mirror 22A and a Fourier lens 22B which are arranged in this order from the side of the beam splitter 16.

The abovementioned object optical system 24 is configured to include a spatial light modulator 24A, a mirror 24B, and a Fourier lens 24C in this order from the side of the abovementioned beam splitter 16.

Further, the abovementioned imaging optical system 26 is configured to include an imaging lens 26A and an image pickup device 26B which are arranged in this order from the side of the abovementioned holographic recording medium 20.

The numeral 32 in FIG. 1 represents a control apparatus for controlling the abovementioned laser beam source 12, the position controller 28, and the servo system 30. This control apparatus 32 outputs a signal of information to be recorded to the abovementioned spatial light modulator 24A via a data encoder 25.

Further, the abovementioned image pickup device 26B is configured to output an output signal to the control apparatus 32 via a data decoder 27.

Next, a description will be given of a process of recording information to and reproducing information from the holographic recording medium 20 by means of the abovementioned holographic multiplex recording apparatus 10.

A laser beam (a recording beam) emitted from the laser beam source 12 is split into the reference beam and the object beam by the beam splitter 16.

The reference beam, which is the transmission beam of the beam splitter 16, enters the reference optical system 22, is reflected by the mirror 22A, and is projected onto the holographic recording medium 20 via the Fourier lens 22B.

The object beam, which is the reflection beam of the beam splitter 16, enters the object optical system 24 and is amplitude-modulated by the spatial light modulator 24A according to the data to be recorded. In more detail, the data encoder 25 encodes digital data to be recorded as page type data, and this is displayed in the abovementioned spatial light modulator 24A so that the object beam is provided with the data as amplitude modulation.

The reference beam and the object beam intersect in a recording layer 20A of the holographic recording medium 20 to thereby form optical interference fringes.

Since the abovementioned recording layer 20A is formed of a photosensitive material which changes the refractive index upon exposure to a laser beam, the interference pattern is recorded as a refractive index distribution of the recording layer.

When the digital date recorded in the recording layer 20A of the abovementioned holographic recording medium 20 is reproduced, all the pixels of the spatial light modulator 24A are turned into an off state (a state in which the object beam is shaded), and only a reproduction beam (the reference beam) is projected onto the holographic recording medium 20. At this time, the refractive index distribution having already been recorded in the recording layer 20A serves as a diffraction grating or a volume hologram. Then, at least a part of the reproduction beam is converted into a diffraction beam, and a beam (the diffraction beam) equivalent to the object beam upon recording emerges. This forms an image on a detection surface of the image pickup device 26B in the imaging optical system 26 as a real image of the spatial light modulator 24A on the optical path of the abovementioned object beam.

In this manner, the diffraction beam upon reproduction forms, on the detection surface of the image pickup device 26B, the image of the amplitude modulated pattern provided upon recording by the spatial light modulator 24A, and the amplitude modulated pattern detected by the image pickup device 26B is decoded by the abovementioned data decoder 27 and converted to digital data again.

In the abovementioned holographic recording medium 20, markers (not shown) are formed which are required to servo-control addresses, positions, and the like, and the abovementioned servo system 30 is configured to perform an access action to a correct recording-reproducing position by detecting the abovementioned marker.

The abovementioned control apparatus 32 is a circuit for controlling optical actions related to recording and reproducing as described above in a centralized manner and is configured to perform signal processing, data input-output, servo and address control, timing management between devices, and the like.

For example, the laser beam source 12 generates pulses by means of pulse light emission or a shutter, and the spatial light modulator 24A and the image pickup device 26B must perform frame processing in synchronous with the light emission timing of the laser beam source 12. Further, the position control of the holographic recording medium 20 must be in consonance with these periodical actions.

The abovementioned control apparatus 32 performs the complex timing management as described above in an integral manner and the position controller 28 moves the holographic recording medium 20. This achieves multiplexing of holograms (data pages) by means of spherical shift multiplex recording.

The movement of the holographic recording medium is achieved by rotational motion when the holographic recording medium has a disc-like shape and by translational motion for a card-like shape.

Next, with reference to FIG. 2, a description will be given of a process of performing the holographic multiplex recording method of the present invention by controlling the laser beam source 12, the position controller 28, and the servo system 30 by means of the abovementioned control apparatus 32.

In this method, recording spots RS which are superimposed with one another with a slight shift in the X-axis direction and the Y-axis direction and have a diameter of 2R are formed by slightly shifting a beam spot, which is an overlapping projection region of the object beam and the reference beam, along the surface of the abovementioned recording layer 20A for each projection when the recording spots of interference fringes are formed in the recording layer 20A in the abovementioned holographic recording medium 20 by projecting the object beam and the reference beam. This method comprises an X-axis direction first multiplex recording step and an X-axis direction second multiplex recording step to an X-axis direction last multiplex recording step by repeating a step which is similar to the X-axis direction first multiplex recording step to thereby form the recording spots.

Figure 2:
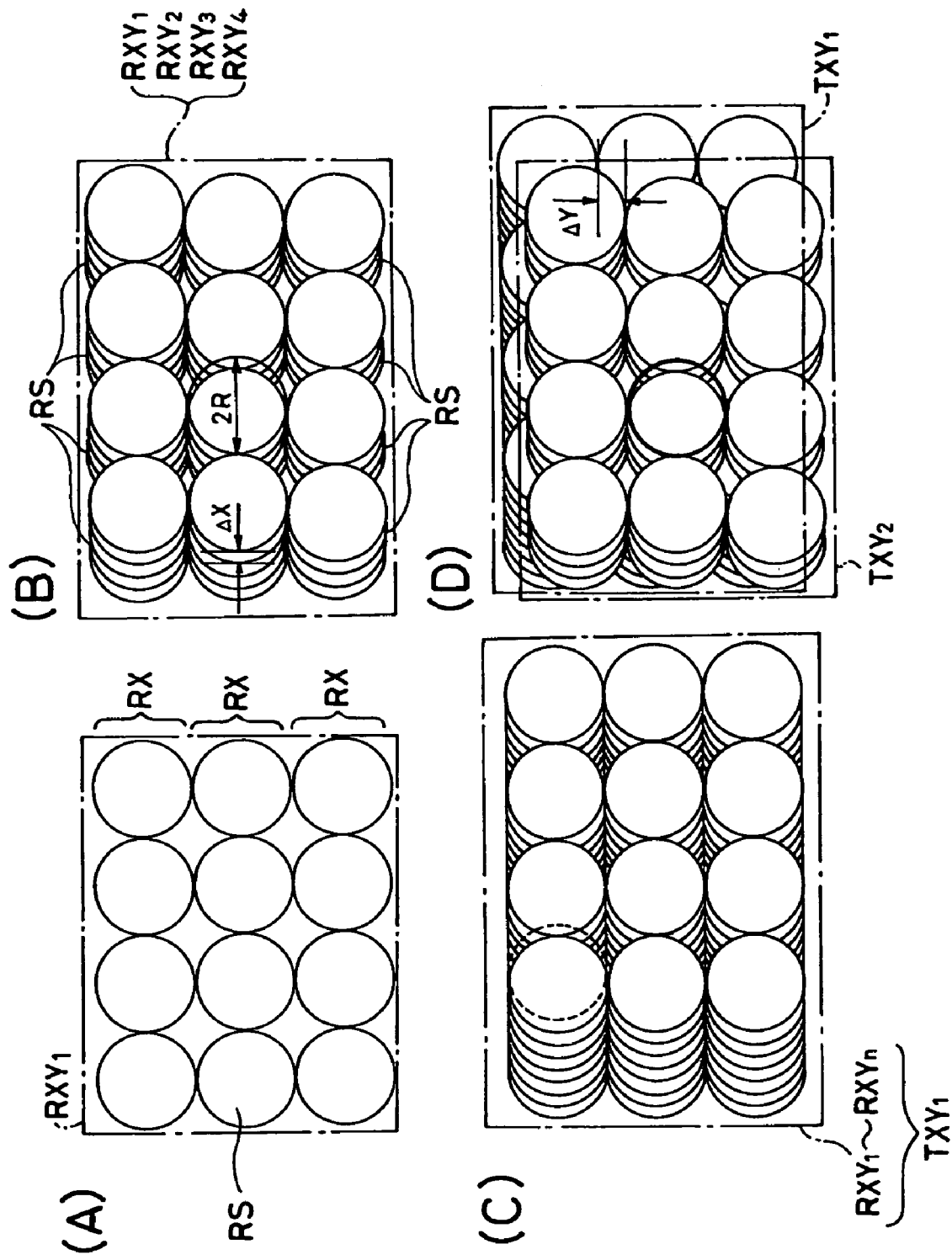
FIG. 2 is a plan view schematically showing a recording process by means of the holographic multiplex recording method according to a first embodiment of the present invention.

The abovementioned X-axis direction first multiplex recording step comprises: a step of first forming a first recording spot matrix $RXY_1$ by forming and arranging recording spot rows $RX_1$ comprising the recording spots RS arranged adjacent to each other with a constant pitch in the X-axis direction without overlapping, in the Y-axis direction with a constant pitch in an adjacent manner without overlapping as shown in FIG. 2(A); a step of forming a second recording spot matrix $RXY_2$ by forming and arranging recording spot rows $RX_2$ comprising recording spots shifted slightly ($\Delta X$) in the X-axis direction with respect to the abovementioned first recording spot matrix $RXY_1$ and having the same phase and the same pitch in the Y-axis direction as those of the abovementioned first recording spot matrix $RXY_1$, in the Y-axis direction with a constant pitch in an adjacent manner without overlapping; and a step of forming a first-stage multiplex recording spot matrix $TXY_1$ by repeating a process of forming and arranging recording spot rows comprising recording spots phase-shifted slightly ($\Delta X$) in the X-axis direction with respect to the recording spot rows in the matrix of the previous process and having the same phase and the same pitch (2R) in the Y-axis direction as those of the recording spot rows in the matrix of the previous process, in the Y-axis direction with a constant pitch in an adjacent manner without overlapping until immediately before the total sum of the phase shift $\Delta X$ in the X-axis direction from the abovementioned first recording spot matrix to a last recording spot matrix becomes the same as the pitch between the abovementioned recording spot rows in the X-axis direction to thereby form a third recording spot matrix $RXY_3$ to the last recording spot matrix $RXY_n$ (see FIG. 2 (C)).

The abovementioned X-axis direction second multiplex recording step to the abovementioned X-axis last multiplex recording step are provided for forming the recording spots by shifting the phase of second-stage to last-stage multiplex recording spot matrices $TXY_2$ to $TXY_n$ (not shown) slightly ($\Delta Y$) in the Y-axis direction from one another with respect to each of the recording spot rows RX in the abovementioned X-axis direction first multiplex recording step, the recording spots being formed until immediately before the total sum of the phase shift ($\Delta Y$) in the Y-axis direction up to the X-axis direction last multiplex recording step becomes the same as the pitch (2R) between the abovementioned recording spot rows in the Y-axis direction.

Again, for ease of understanding, as shown in FIG. 2(A), the recording spots RS are formed adjacent to one another so as not to overlap in the X-axis direction and the Y-axis direction, thereby forming the first recording spot matrix $RXY_1$. Next, as shown in FIG. 2(B), the second to fourth recording spot matrices $RXY_2$ to $RXY_4$ having an arrangement similar to that of the first recording spot matrix $RXY_1$ are recorded by shifting relative to one another, by $\Delta X$ in the right direction, with respect to each of the recording spots RS of the abovementioned first recording spot matrix $RXY_1$. A step similar to the above is repeated until the state shown in FIG. 2(C) or immediately before the total sum of $\Delta X$ becomes the same as the pitch (=2R) of the recording spot RS in the X-axis direction to thereby complete the first-stage multiplex recording spot matrix $TXY_1$.

Subsequently, the same procedure as in that of the abovementioned first-stage multiplex recording spot matrix $TXY_1$ is followed to form the second-stage multiplex recording spot matrix $TXY_2$ by shifting in the Y-axis direction by a shift amount $\Delta Y$ as shown in FIG. 2(D). This is repeated until immediately before the total sum of the shift amount $\Delta Y$ becomes the same as the pitch (2R) of the recording spot RS in the Y-axis direction to thereby form the last-stage multiplex recording spot matrix $TXY_n$ (not shown). Thus, the multiplexing in the Y-axis direction is completed.

Here, the multiplexing may be completed at an earlier stage according to the amount of information to be recorded. Further, when the amount of information is previously known, the shift amount $\Delta X$ may be increased to attempt to decrease the cross talk between pages.

In the case where the shift multiplex recording in the X-axis direction is first performed followed by the shift multiplex recording in the Y-axis direction as mentioned above, the shift multiplex recording is performed in the X-axis direction as much as possible without a shift in the Y-axis direction. After completion of this, a step is repeated in which the next multiplex recording in the X-axis direction is performed in a position shift-multiplexed in the Y-axis direction. In this manner, an advantage is obtained in that the remaining dynamic range upon recording of each of the recording spots RS is made uniform.

Second Embodiment

Figure 3:
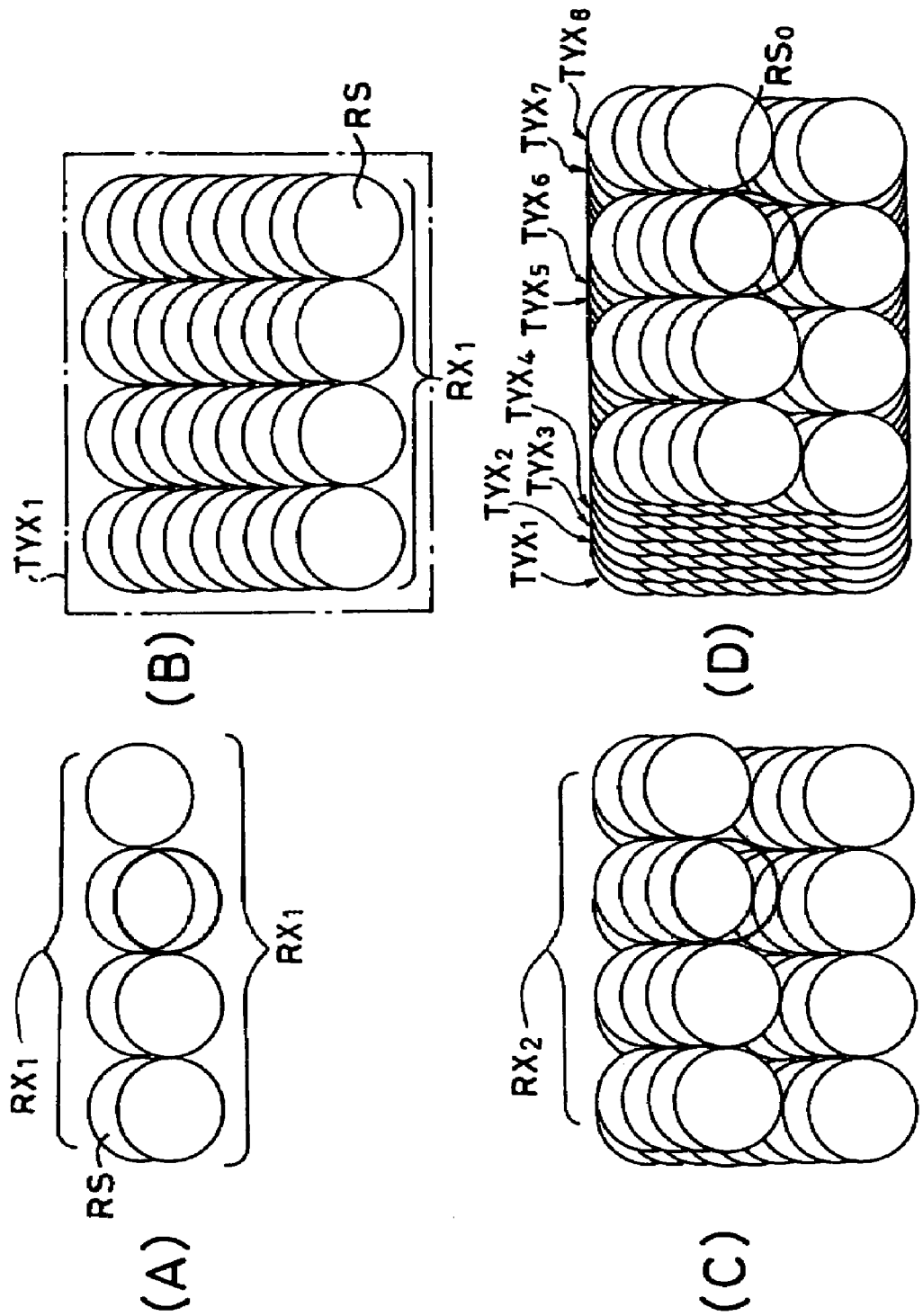
FIG. 3 is a plan view similar to that of FIG. 2 showing a recording process by means of a holographic multiplex recording method according to a second embodiment.

Next, a second embodiment will be described with reference to FIG. 3.

The second embodiment is configured to include: a Y-axis direction first multiplex recording step of forming a Y-axis direction first multiplex recording spot matrix $TYX_1$ shown in FIG. 3(B) by arranging first-stage recording spot rows $RX_1$ comprising recording spots RS arranged with a constant pitch in the X-axis direction and adjacent to each other without overlapping as shown in FIG. 3(A), in the Y-axis direction with a slight phase shift ($\Delta Y$) relative to one another; a Y-axis direction second multiplex recording step of forming a Y-axis direction second multiplex recording spot matrix $TYX_2$ by arranging recording spot rows $RX_2$ comprising the recording spots RS arranged with a constant pitch in the X-axis direction and adjacent to each other without overlapping with reference to a position slightly phase-shifted ($\Delta X$) in the X-axis direction with respect to the abovementioned first-stage recording spot rows RX1, in the Y-axis direction with a slight phase shift ($\Delta Y$) relative to one anther; and a step of forming the Y-axis direction multiplex recording spot matrix $TYX_1$ to a Y-axis direction last multiplex recording spot matrix $TYX_n$ (not shown) in a similar manner as above.

Figure 4:
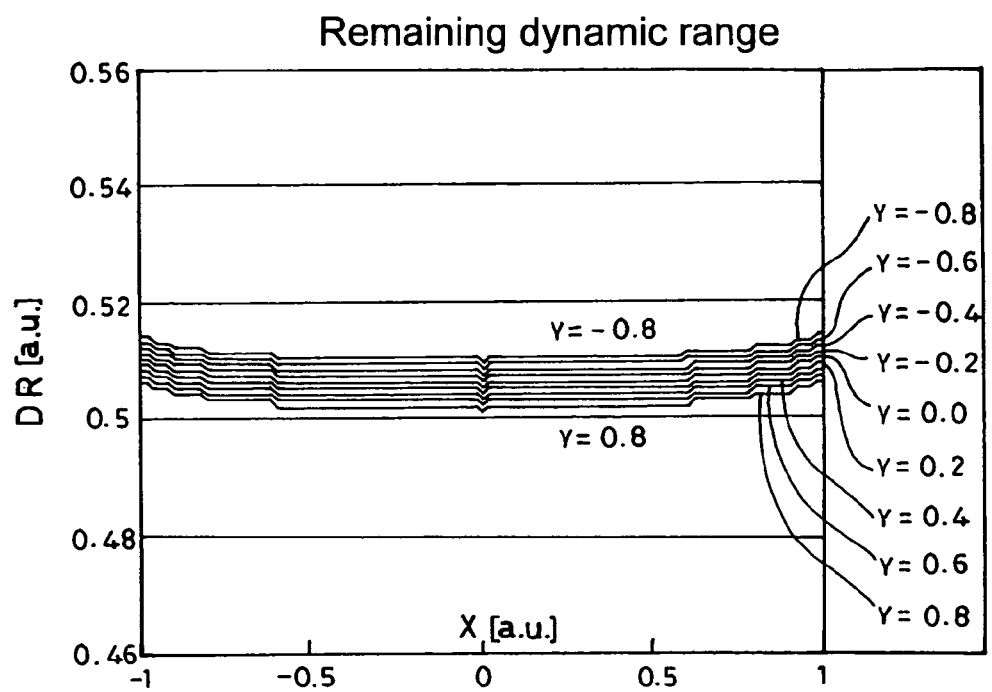
FIG. 4 is a graph showing remaining dynamic range of a recording area versus the amount of shift in the X-axis direction when holographic multiplex recording is performed according to the second embodiment.
Figure 5:
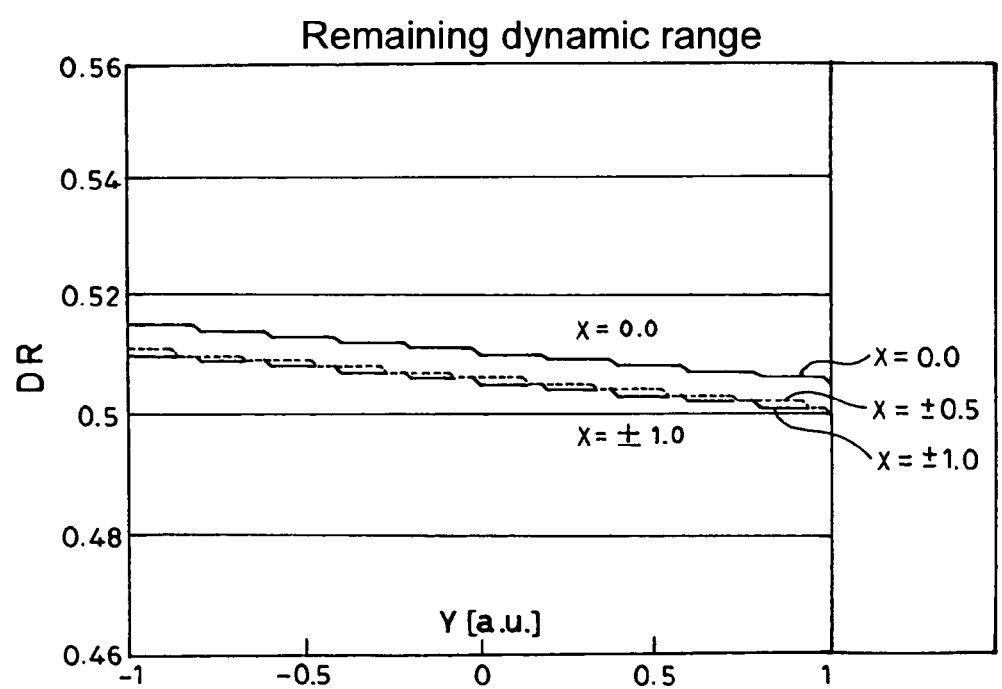
FIG. 5 is a graph showing the remaining dynamic range versus the amount of shift in the Y-axis direction.

The remaining dynamic range in a recording area when holographic multiplex recording is performed by means of the method of the second embodiment is computed and shown in FIGS. 4 and 5.

Here, the remaining dynamic range was computed for the case where a recording spot $RS_0$ represented by a thick line in FIG. 3(D) was recorded, but the recording spots in any position are essentially the same. Moreover, the absolute value of the dynamic range varies depending on the number of repeated recording of the recording spot $RS_0$ represented by the thick line, but the fluctuation in the recording area is the same.

Figure 12:
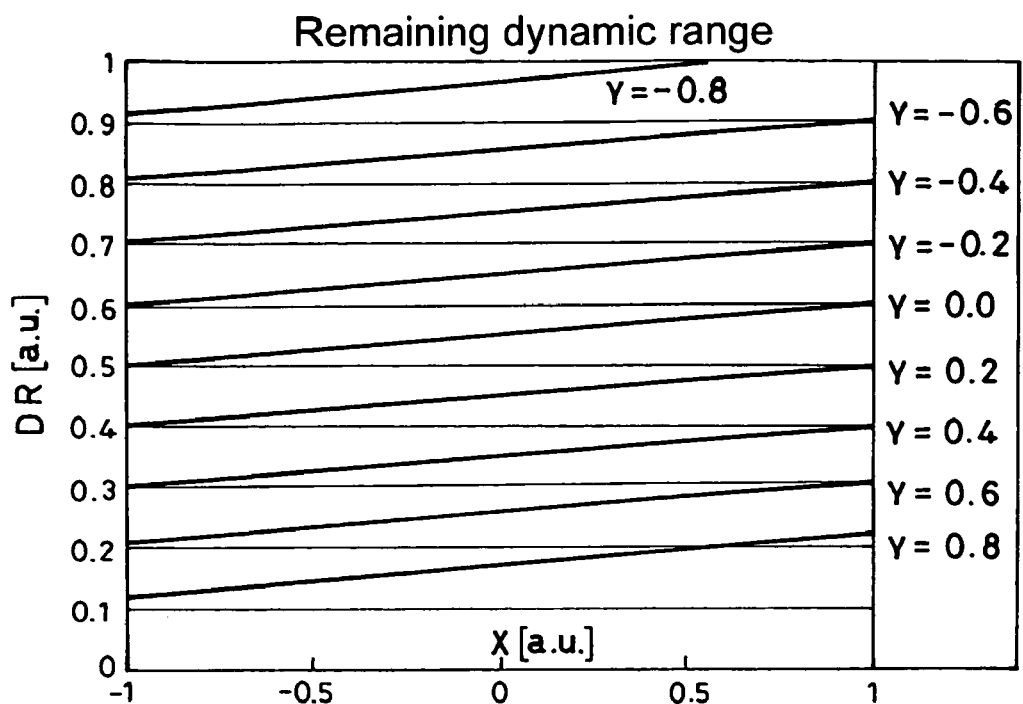
FIG. 12 is a graph showing the remaining dynamic range of a recording area in relation to a shift position in the X-axis direction during the normal spherical shift multiplex recording.
Figure 13:
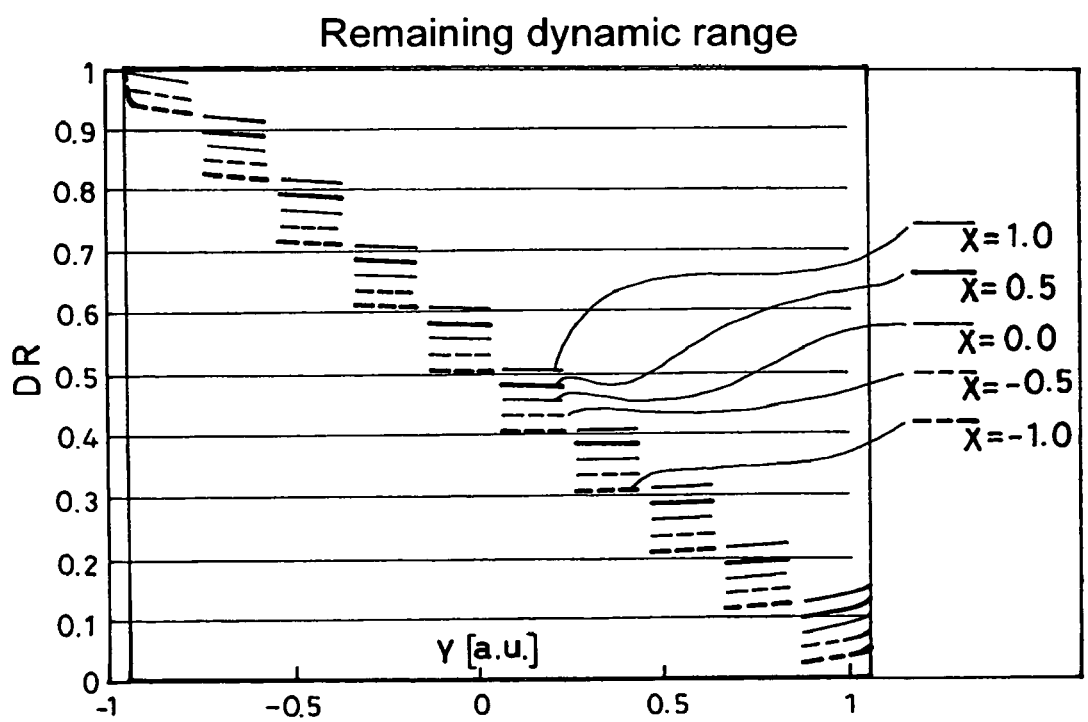
FIG. 13 is a graph showing the remaining dynamic range in relation to a shift position in the Y-axis direction.

The same parameters employed in FIGS. 12 and 13 described above were employed, and the spot radius R of the recording area was normalized to 1. The shift amounts, $\Delta X=0.01$ and $\Delta Y=0.1$, were employed, and the recording spot of the 51st cycle among a maximum of 100 cycles in the X-axis direction was employed. As can also be seen from FIGS. 4 and 5, the remaining dynamic range falls within the range from 0.5 to 0.52 in the second embodiment while the remaining dynamic range is distributed in the range from approximately 0 to 1 in the conventional case (see FIGS. 12 and 13). Therefore, excellent recording-reproducing is found to be possible.

Third Embodiment

Figure 6:
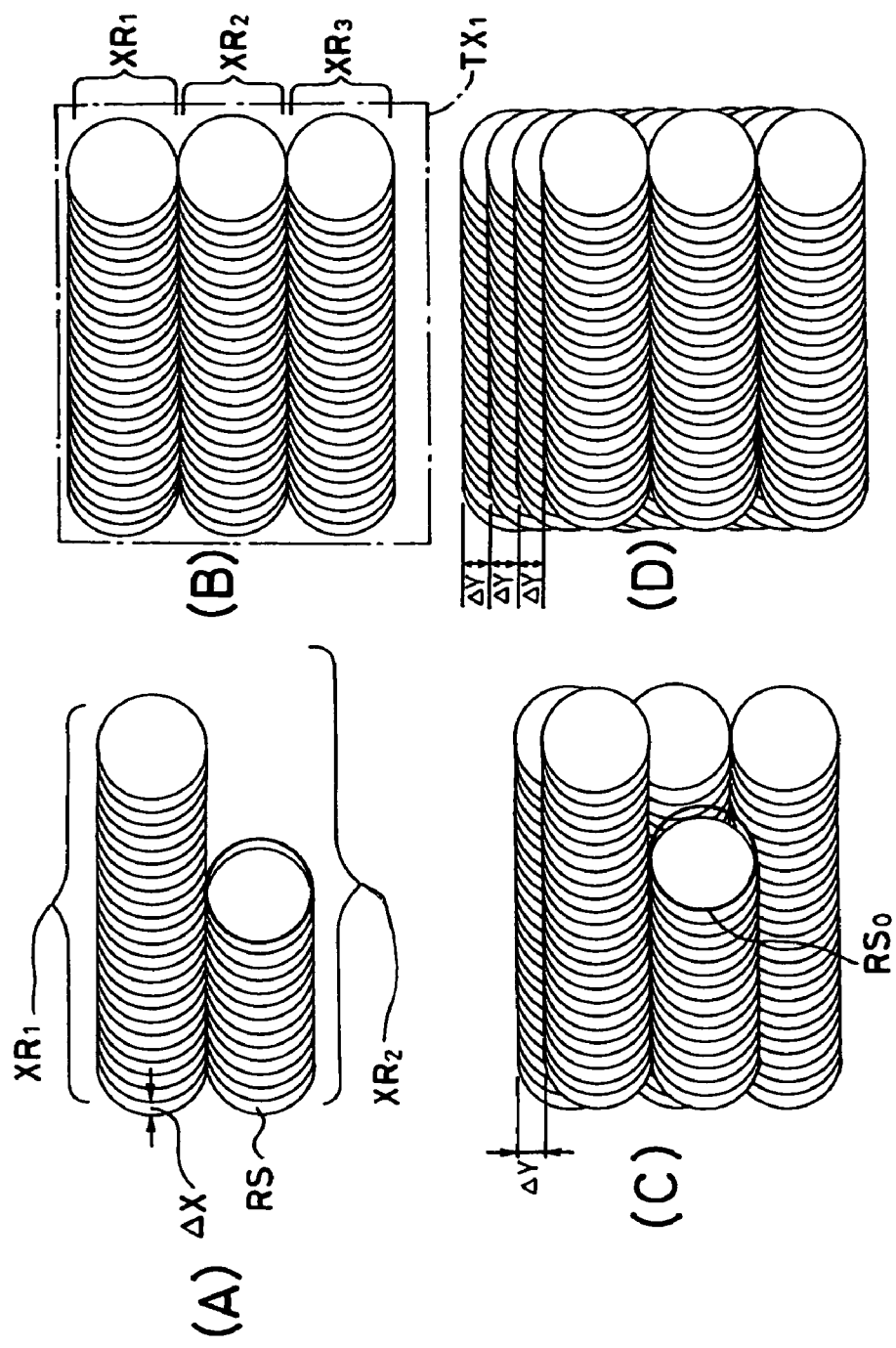
FIG. 6 is a plan view similar to that of FIG. 2 showing a recording process by means of a holographic multiplex recording method according to a third embodiment.

Next, a method of a third embodiment of the present invention will be described with reference to FIG. 6.

This holographic multiplex recording method forms the recording spots by carrying out a first-stage X-axis direction multiplex recording step to a last-stage X-axis direction multiplex recording step.

The abovementioned first-stage X-axis direction multiplex recording step comprises: an X-axis direction first multiplex recording step of forming an X-axis direction first multiplex recording spot row $XR_1$ by arranging the recording spots RS in the X-axis direction with a slight phase shift relative to one another as shown in FIG. 6(A); an X-axis direction second multiplex recording step of forming an X-axis direction second multiplex recording spot row $XR_2$ by arranging the recording spots RS with a slight phase shift ($\Delta X$) relative to one another in positions adjacent and parallel to the abovementioned X-axis direction first multiplex recording spot row $XR_1$ and without overlapping in the Y-axis direction; and a step of forming and sequentially arranging an X-axis direction third multiplex recording spot row $XR_3$ to an X-axis direction last multiplex recording spot row $XR_n$ (not shown) in a similar manner as above as shown in FIG. 6(B) to thereby form an X-axis direction first multiplex recording spot matrix $TX_1$.

Further, in the second-stage X-axis direction multiplex recording step to the last-stage X-axis direction multiplex recording step, an X-axis direction second multiplex recording spot matrix $TX_2$ to an X-axis direction last multiplex recording spot matrix $TX_n$ (not shown) are formed by repeatedly shifting the phase relative to one another by a slight amount ($\Delta Y$) in the Y-axis direction with respect to each of the X-axis direction multiplex recording spot rows $XR_1$ to $XR_n$ in the abovementioned first-stage X-axis direction multiplex recording step (see FIG. 6(C) and (D)) until immediately before the total sum of the phase shift in the Y-axis direction up to the last-stage X-axis direction multiplex recording step becomes the same as the pitch (2R) between the abovementioned X-axis direction multiplex recording spot rows in the Y-axis direction, as shown in FIG. 6(D).

Figure 7:
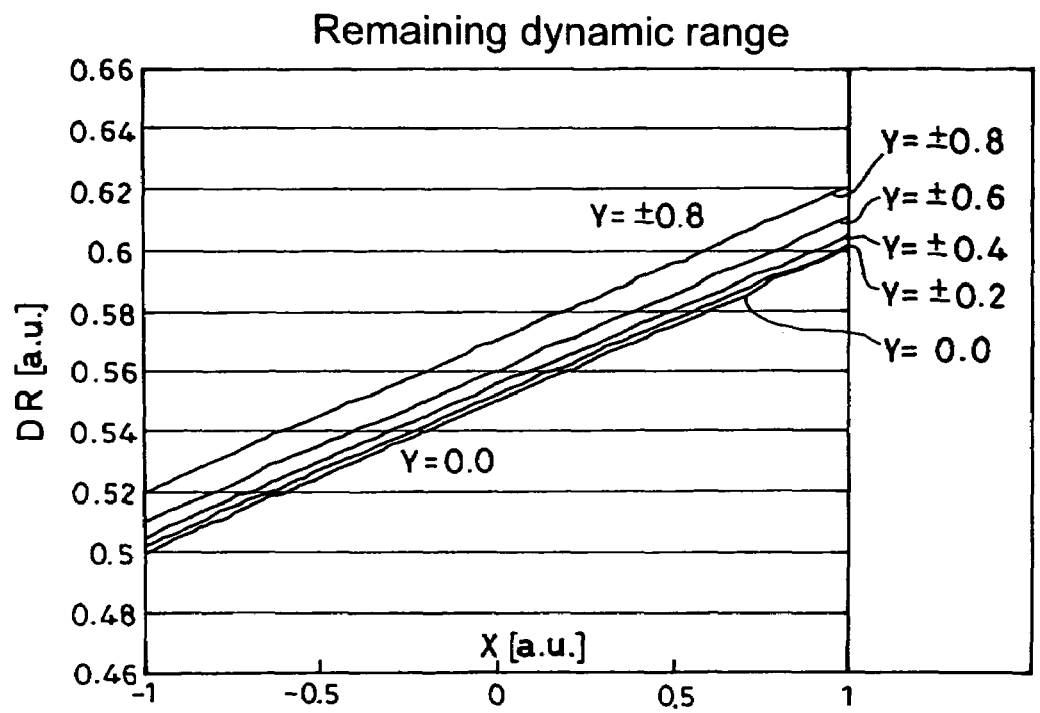
FIG. 7 is a graph showing the remaining dynamic range of a recording area versus the amount of shift in the X-axis direction when recording is performed by means of the method of the third embodiment.
Figure 8:
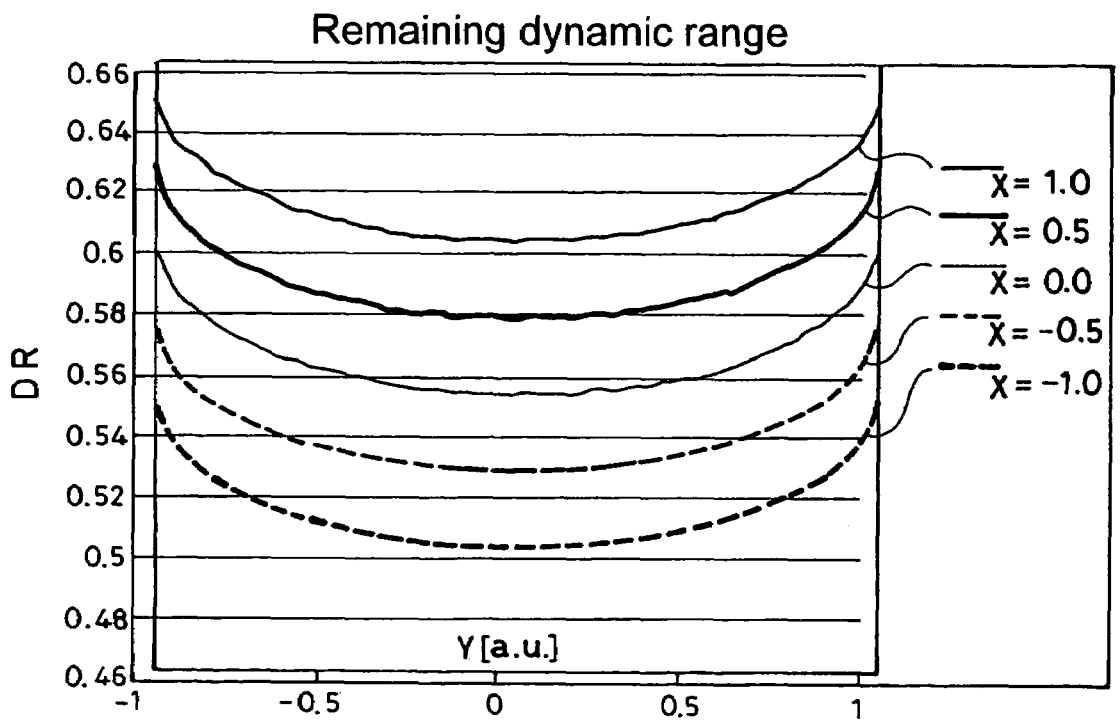
FIG. 8 is a graph showing the remaining dynamic range versus the amount of shift in the Y-axis direction.
Figure 9:
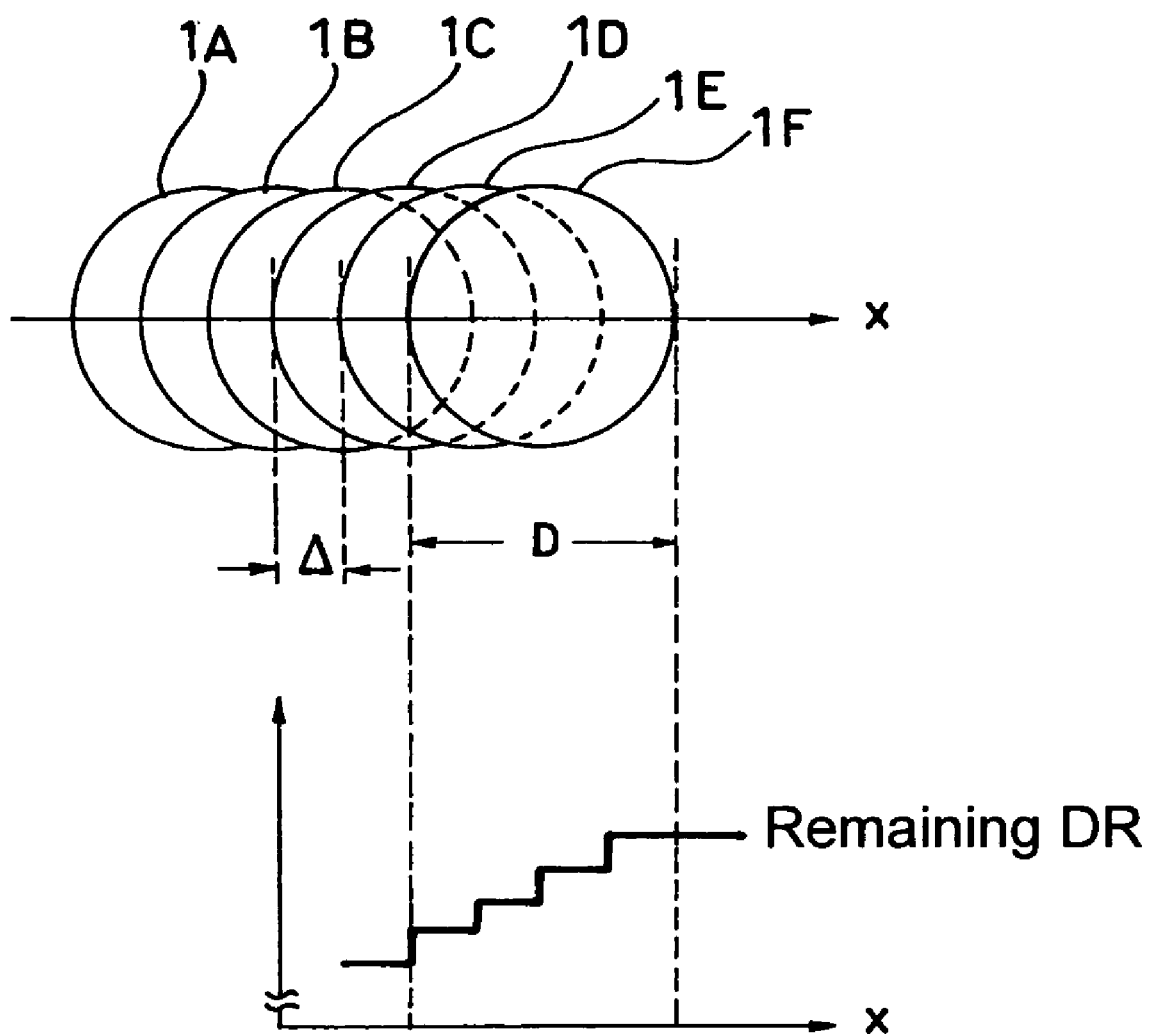
FIG. 9 is a graph showing the relationship between a recording spot position and the remaining dynamic range for conventional holographic shift multiplex recording.
Figure 10:
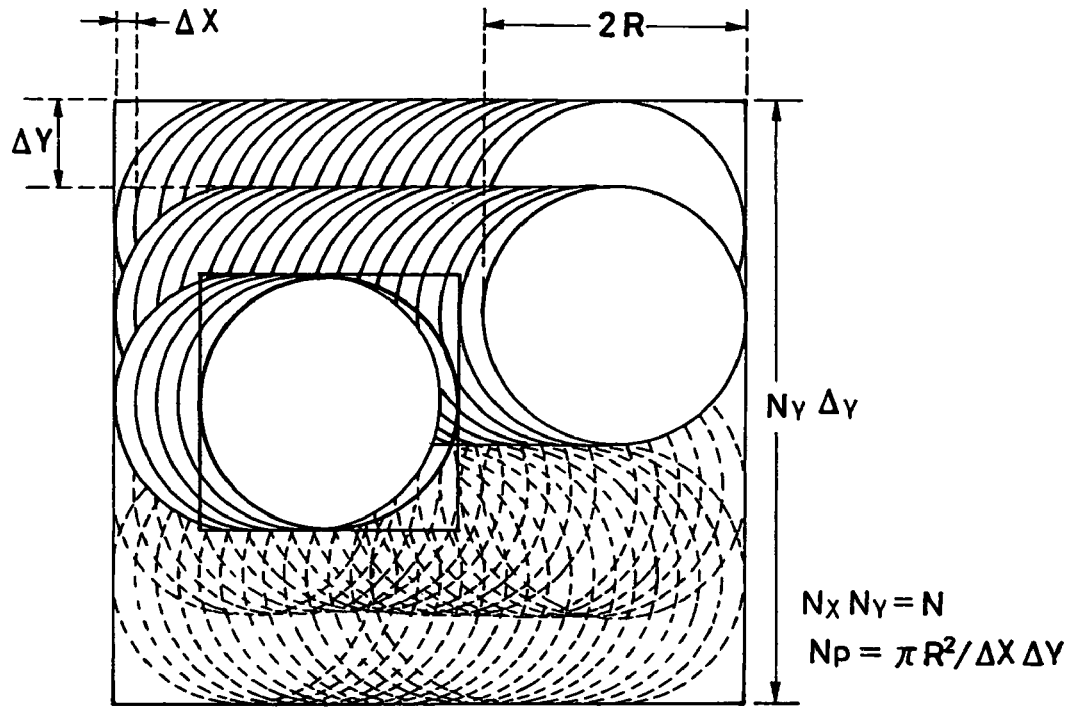
FIG. 10 is a diagram showing a geometrical arrangement of superimposed holograms in normal spherical shift multiplex recording.
Figure 11:
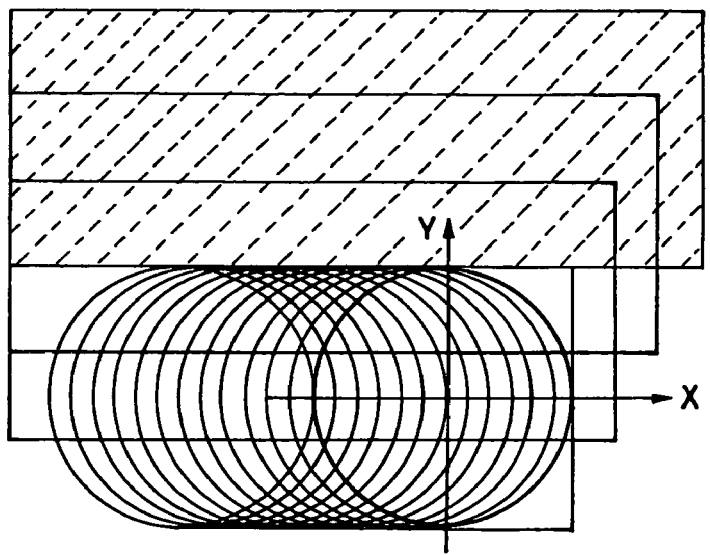
FIG. 11 is a plan view schematically showing an intermediate state in which shift multiplex recording in the Y-axis direction is performed after completion of multiplexing in the X-axis direction during the abovementioned spherical shift multiplex recording.

The computed remaining dynamic range values for the third example are shown in FIGS. 7 and 8. Here, this computation represents the case for a recording spot $RS_0$ represented by a thick line circle in FIG. 6(C).

As can be seen from these figures, the fluctuation width of the remaining dynamic range falls within the range from 0.5 to 0.65. Therefore, more uniform recording as compared to that in a conventional technology is found to be possible.

Further, the recording spot rows or the recording spot matrix comprising the recording spots arranged adjacent to each other without overlapping in each of the above embodiments is not necessarily adjacent to each other but may be separated apart.

INDUSTRIAL APPLICABILITY

In this invention, the recording spots superimposed with a slight shift relative to one another in the X-axis direction and the Y-axis direction are formed such that the remaining dynamic range in each recording spot is made uniform as much as possible. Therefore, nonuniformity of grating intensity caused by the nonuniformity of the dynamic range can be suppressed to thereby obtain an excellent image.

The invention claimed is:

1. A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam, the holographic multiplex recording method comprising:
an X-axis direction first multiplex recording step of forming a first-stage multiplex recording spot matrix, comprising,
a step of forming a first recording spot matrix by forming and arranging recording spot rows comprising recording spots arranged with a constant pitch in the X-axis direction without overlapping, with a constant pitch in the Y-axis direction without overlapping,
a step of forming a second recording spot matrix by forming and arranging recording spot rows comprising recording spots slightly phase-shifted in the X-axis direction with respect to the first recording spot matrix and having the same phase and the same pitch in the Y-axis direction as those of the first recording spot matrix, with a constant pitch in the Y-axis direction without overlapping, and
a step of forming a third recording spot matrix to a last recording spot matrix by repeating formation of recording spot rows comprising recording spots slightly phase-shifted in the X-axis direction with respect to the recording spot rows of the previous recording spot matrix and having the same phase and the same pitch in the Y-axis direction as those of the recording spot rows of the previous recording spot matrix, with a constant pitch in the Y-axis direction without overlapping until immediately before the total sum of the phase shift in the X-axis direction from the first recording spot matrix to a last recording spot matrix becomes the same as the pitch between the recording spot rows in the X-axis direction; and
a step of forming a second-stage to a last-stage multiplex recording spot matrices by an X-axis direction second multiplex recording step to an X-axis direction last multiplex recording step which are similar to the X-axis direction first multiplex recording step and repeat thereof,
wherein: the total sum of the phase shift from the first recording spot matrix to the last recording spot matrix in the X-axis direction is set until immediately before the total sum becomes the same as the pitch between the recording spot rows in the X-axis direction; and
the X-axis direction second multiplex recording step to the X-axis direction last multiplex recording step are performed by slightly shifting the phase relative to one another in the Y-axis direction with respect to each of the recording spot rows in the X-axis direction first multiplex recording step until immediately before the total sum of the phase shift in the Y-axis direction up to the X-axis direction last multiplex recording step becomes the same as the pitch between the recording spot rows in the Y-axis direction.

2. A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam,
the holographic multiplex recording method comprising:
a Y-axis direction first multiplex recording step of forming a Y-axis direction first recording spot matrix by arranging first-stage recording spot rows comprising recording spots arranged with a constant pitch in the X-axis direction without overlapping, in the Y-axis direction with a slight phase shift relative to one another;
a Y-axis direction second multiplex recording step of forming a Y-axis direction second multiplex recording spot matrix by arranging second-stage recording spot rows comprising recording spots arranged with a constant pitch in the X-axis direction without overlapping with reference to a position slightly phase-shifted in the X-axis direction with respect to the first-stage recording spot rows, in the Y-axis direction with a slight phase shift relative to one another; and
a step of forming a Y-axis direction third multiplex recording spot matrix to a Y-axis direction last multiplex recording spot matrix by repeating a step which is similar to the above until immediately before the total sum of the phase shift in the X-axis direction from the Y-axis direction first multiplex recording spot matrix to a Y-axis direction last multiplex recording spot matrix becomes the same as the pitch between the recording spot rows in the X-axis direction.

3. A holographic multiplex recording method for forming recording spots, which are an overlapping projection region of an object beam and a reference beam, so as to be superimposed with a slight shift relative to one another in an X-axis direction and a Y-axis direction when interference fringes are formed in a recording layer in a holographic recording medium by projecting the object beam and the reference beam,
the holographic multiplex recording method comprising:
a first-stage X-axis direction multiplex recording step of forming an X-axis direction first-stage multiplex recording spot matrix, the step comprising,
an X-axis direction first multiplex recording step of forming an X-axis direction first multiplex recording spot row by arranging recording spots in the X-axis direction with a slight phase shift relative to one another,
an X-axis direction second multiplex recording step of forming an X-axis direction second multiplex recording spot row by arranging recording spots with a slight phase shift relative to one another in positions parallel and adjacent to the X-axis direction first multiplex recording spot row and without overlapping in the Y-axis direction, and
a step of forming and sequentially arranging an X-axis direction third multiplex recording spot row to an X-axis direction last multiplex recording spot row in a similar manner; and
a step of forming an X-axis direction second-stage multiplex recording spot matrix to an X-axis direction last-stage multiplex recording spot matrix by a second-stage X-axis direction multiplex recording step to a last-stage X-axis direction multiplex recording step which are similar to the first-stage X-axis direction multiplex recording step and repeat thereof,
wherein, in the second-stage X-axis direction multiplex recording step to the last-stage X-axis direction multiplex recording step, the recording spots are repeatedly formed by slightly shifting the phase relative to one another in the Y-axis direction with respect to each of the X-axis direction multiplex recording spot rows in the first-stage X-axis direction multiplex recording step until immediately before the total sum of the phase shift in the Y-axis direction up to the last-stage X-axis direction multiplex recording step becomes the same as the pitch between the X-axis direction multiplex recording spot rows in the Y-axis direction.

* * * * *